(No Model.)  3 Sheets—Sheet 1.

H. O. PEABODY.
FERTILIZER DISTRIBUTER.

No. 320,279.  Patented June 16, 1885.

Witnesses:
Walter E. Lombard.
Frank E. Bray.

Inventor:
Henry O. Peabody,
by N. C. Lombard
Attorney.

(No Model.) 3 Sheets—Sheet 2.

H. O. PEABODY.
FERTILIZER DISTRIBUTER.

No. 320,279. Patented June 16, 1885.

Witnesses:
Walter E. Lombard
Frank O. Gray

Inventor:
Henry O. Peabody,
by N. C. Lombard
Attorney.

N. PETERS, Photo-Lithographer, Washington, D. C.

(No Model.)  3 Sheets—Sheet 3.

H. O. PEABODY.
FERTILIZER DISTRIBUTER.

No. 320,279. Patented June 16, 1885.

Witnesses:
Walter E. Lombard,
Frank E. Gray.

Inventor:
Henry O. Peabody,
by N. C. Lombard
Attorney.

United States Patent Office.

HENRY O. PEABODY, OF BOSTON, MASSACHUSETTS.

FERTILIZER-DISTRIBUTER.

SPECIFICATION forming part of Letters Patent No. 320,279, dated June 16, 1885.

Application filed April 17, 1885. (No model.)

*To all whom it may concern:*

Be it known that I, HENRY O. PEABODY, of Boston, in the county of Suffolk and State of Massachusetts, have invented certain new and useful Improvements in Fertilizer-Distributers, of which the following, taken in connection with the accompanying drawings, is a specification.

My invention relates to machines for distributing fertilizers, and is an improvement upon the invention shown and described in Letters Patent No. 309,404, granted to me December 16, 1884; and it consists in certain novel features of construction, arrangement, and combination of parts, which will be readily understood by reference to the description of the drawings, and to the claims to be hereinafter given.

Figure 1:
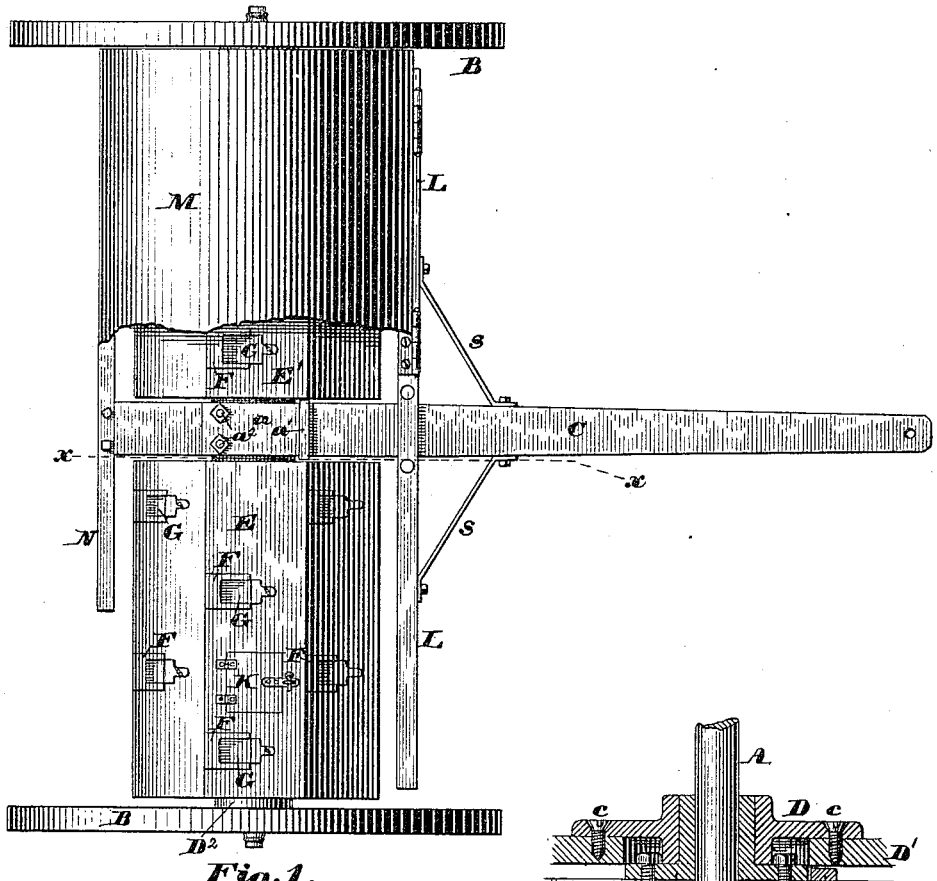
Figure 3:
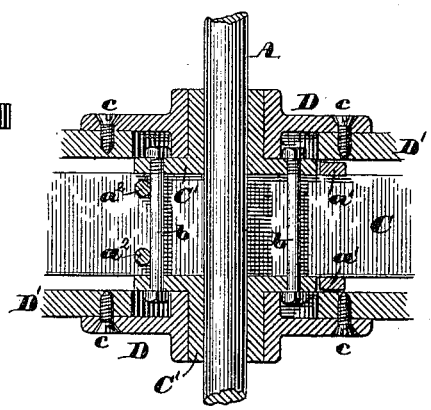
Figure 2:
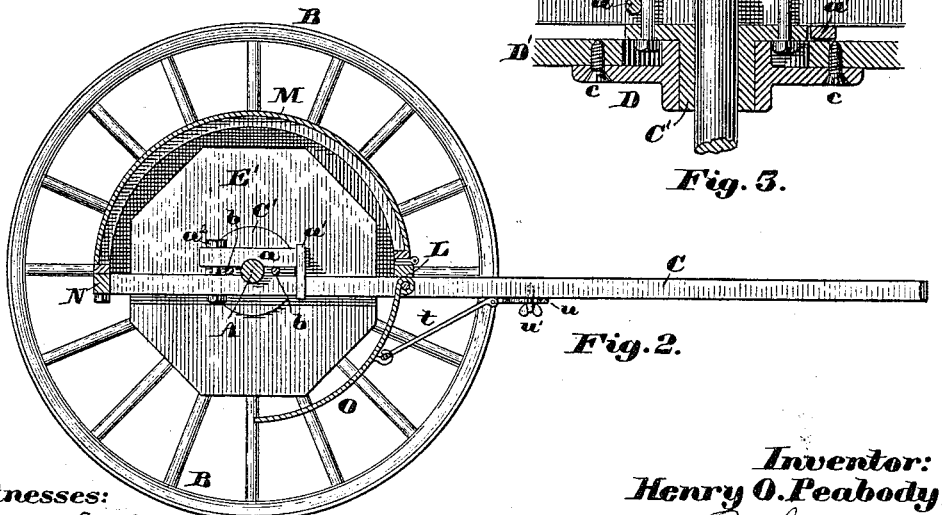
Figures 5, 6:
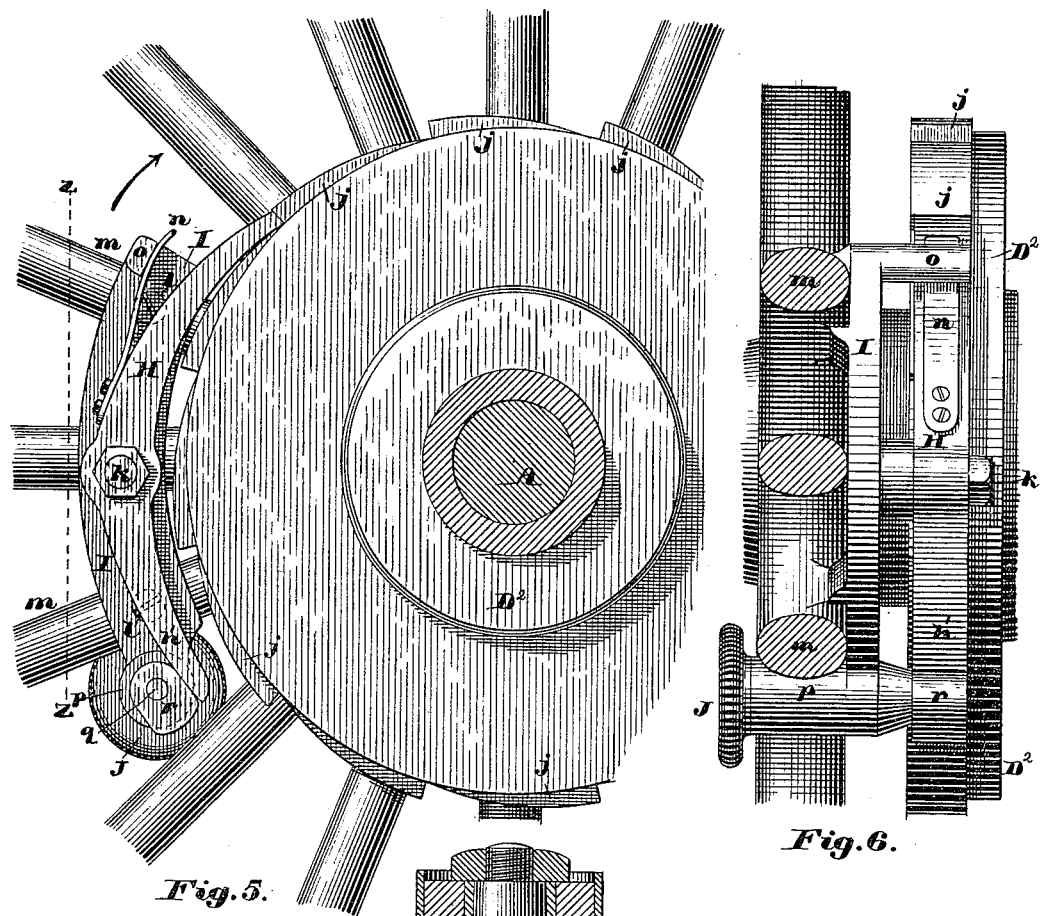
Figure 4:
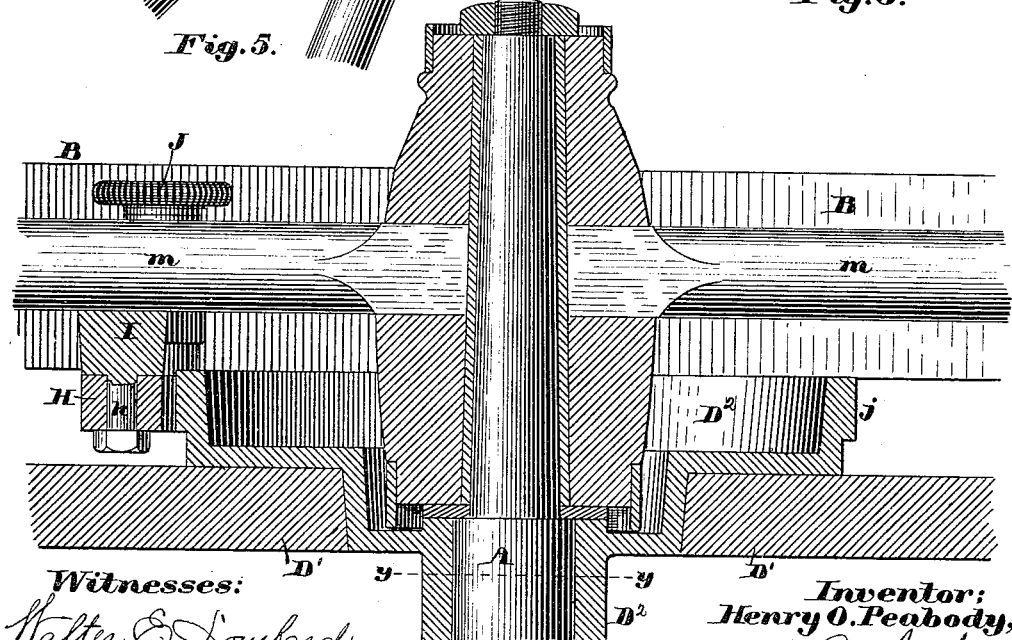
Figures 7, 8, 9:
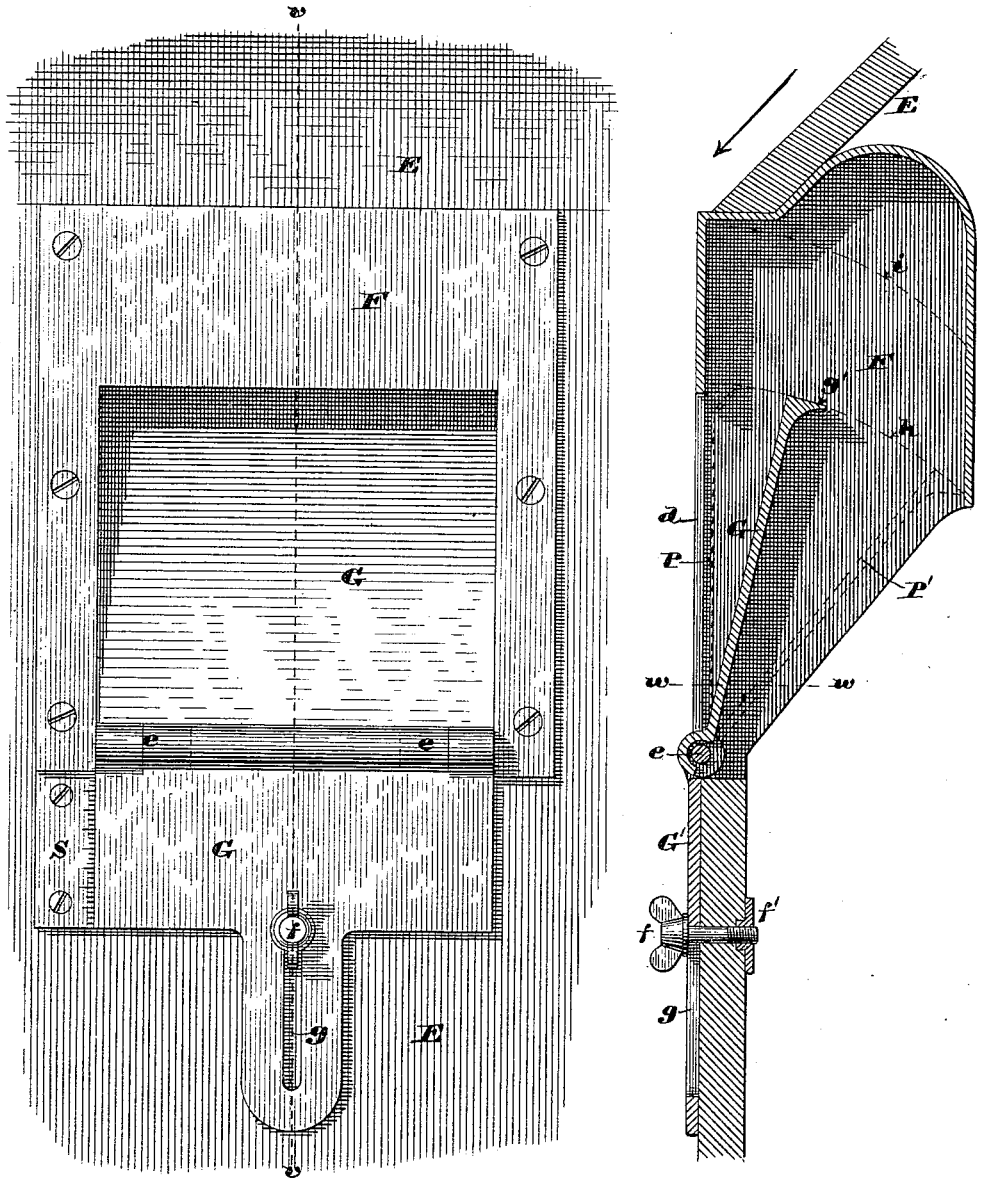

Figure 1 of the drawings is a plan of a machine illustrating my invention, with a portion of the wood broken away the better to show the rotary drums. Fig. 2 is a vertical section on line $x\ x$ on Fig. 1, and showing one drum and wheel in elevation. Fig. 3 is a horizontal section through portions of the inner heads of the two drums, and illustrating the manner of attaching the pole or perch to the axle. Fig. 4 is a section through the axis of the hub of one wheel and a portion of the outer head of one drum, and illustrates the manner of connecting and disconnecting the drum and wheel. Fig. 5 is a sectional elevation of the same parts, the cutting plane being on line $y\ y$ on Fig. 4, and the wooden portions of the head being removed. Fig. 6 is a sectional plan of the same parts, the cutting plane being on line $z\ z$ on Fig. 5. Fig. 7 is a plan of a small portion of one of the drums with one of the buckets and gates attached thereto. Fig. 8 is a section of the same on line $v\ v$ on Fig. 7, and Fig. 9 is a section on line $w\ w$ on Fig. 8.

Fig. 3 is drawn to a scale twice as large as Figs. 1 and 2, Figs 4, 5, and 6 to a larger scale, and Figs. 7, 8, and 9 to a still larger scale.

In the drawings, A is the axle, having mounted upon each end thereof so as to revolve freely thereon a wheel, B, and having firmly secured to the middle of its length the perch or pole C. The perch or pole C is clamped to the axle by means of the cap $a$, strap $a'$, and bolts $a^2\ a^2$, and is additionally braced and strengthened by the two flanged hubs C' C', fitted upon the axle upon opposite sides of the perch C, and secured together and clamping the perch between their flanges by means of the bolts $b\ b$, all as shown in Fig. 3.

The hubs C' C' are turned off to form bearings for the castings D D, to which the inner wooden heads, D' D', of the drums E and E' are secured by screws $c\ c$, as shown in Fig. 3.

The drums E and E' are made preferably of wood, except the centers of their heads, which are composed of the castings D and $D^2$, which have bearings upon and revolve about the hubs C' and the axle A, respectively. The drums E and E' are preferably made octagonal in cross-section, and each has cut through each face of its octagonal periphery one or more openings contiguous to the angle between two of said faces, into each of which is fitted a bucket, F, and secured in a fixed position relative to said drum, as shown in Figs. 7, 8, and 9. The bucket F has cut through its outer plate the rectangular opening $d$, to which is fitted the gate G, pivoted at $e$ to the plate G', secured to the periphery or outer face of the drum by means of the thumb-screw $f$, which passes through the slot $g$ in the plate G', and screws into the nut $f'$ upon the inside of the shell of the drum, so that the gate G may be adjusted from the position shown in Fig. 8 with its movable end on the dotted arc $h$ to a position with its movable end on the dotted arc $i$, as shown in Fig. 8.

The gate G has formed upon its movable end the inwardly-projecting knife-edged rib $g'$, the purpose of which will hereinafter appear.

The castings $D^2$, which form the centers of the outer heads of the drums E and E', each has formed upon its periphery a series of ratchet-teeth, $j$, with which the pawl H engages to impart to said drum a rotary motion about the axle A, upon which it is mounted.

The pawl H is pivoted at $k$ to a stand, I, secured to the spokes $m\ m$ of the wheel B by the screws $l\ l$, and forced into contact with the teeth $j$ by the spring $n$, placed between it and the lug $o$, projecting from the stand I, as shown in Figs. 5 and 6.

The stand I has formed upon its end opposite to the lug o a hub or boss, p, in which is mounted a short shaft, q, having secured upon one end thereof the cam r in position to act upon and depress the arm h' of the pawl H, to disengage said pawl from the teeth j, and provided at its other end with the milled head or collar J, by which said shaft and cam may be rotated.

Each of the drums E and E' is provided with an opening in its periphery, closed by hinged door K, secured by a bolt or other suitable fastening against accidental opening, said opening being for the purpose of charging the drum with the fertilizer to be distributed.

My machine is designed to be connected by the perch C to a forward axle, (not shown in the drawings;) but the perch C may be so constructed as to serve as a pole to which a pair of horses may be harnessed without affecting the principles of my invention.

The perch C has firmly secured thereto, just in front of the drums E and E', the bar L, which extends at right angles to said perch to the outer ends of the drums E and E', and is strengthened by the braces s s, as shown in Fig. 1. To this bar L is hinged the semicircular hood or covering M, arranged to inclose the upper sides of said drums when the machine is in operation, for the purpose of enabling the machine to be used for distributing fertilizer on wet days, the rear of said hood resting upon the shorter bar N, secured upon the rear end of the perch or pole C, as shown in Figs. 1 and 2.

To the under side of the bar L is hinged the curved sheet-metal apron O, extending downward and backward beneath the drums E and E', the same being adjustable to and held in any desired position within certain limits by means of the brace-rod t, the plate u, and the thumb-screw u', said plate u being slotted to permit a movement thereof in the direction of the length of the perch C, as shown in Fig. 2.

The operation of my invention is as follows: The drums E and E' being suitably charged with the material to be distributed, and the pawls H H being thrown out of engagement with the teeth j, the machine may be driven to the ground to be enriched, when, the pawls being allowed to engage with the teeth j, so as to compel the drums to revolve with the wheels, if the machine be driven over the ground, said drums are revolved, and as the buckets F approach a position beneath the axle about which the drums revolve the gates G all assume the position indicated in dotted lines at P in Fig. 8, thus closing the apertures d d, and as the drums continue to revolve the buckets are filled with the fertilizer, and as the motion continues and the buckets approach a position above the axle the gate G falls by the force of gravity from the position P to the position P', (indicated by dotted lines in Fig. 8,) the knife-edged rib g' cutting its way through the material, and causing all of said material lying between said knife-edge and the axis of said gate G to fall to the other side of the chamber, while the material contained in the buckets beyond the movable ends of the gates will, as the drums revolve, fall through the openings d, being guided thereto by the outer face of the gate G, and be received by the curved surface of the apron O, from which it falls to the ground.

If it is desired to distribute a less quantity at each revolution of the drums, the gate G may be adjusted to any point between the position shown in the drawings and a position with its end coinciding with the dotted arc i, as before described.

The advantages of making the drums in two sections operated independently of each other are, that one may be revolved while the other remains stationary, as when only a narrow strip of land remains to be covered by the fertilizer, which one drum will cover, and when turning corners with both drums in gear the drum moving over the most ground will make more revolutions, and consequently distribute more material, than the other drum, which is making less revolutions.

Another and greater advantage of this construction, is that it greatly simplifies and cheapens the construction and attachment to the axle of the perch or pole.

The hood M may be made in one piece or in two parts—one for each drum—without affecting the principle of my invention.

The adjustment of the gate G may be readily determined by means of the graduated scale S, arranged as shown in Fig. 7.

What I claim as new, and desire to secure by Letters Patent of the United States, is—

1. In a machine for distributing fertilizers, two hollow fertilizer-holding drums mounted upon the same axle with the supporting-wheels, and provided with apertures for discharging the material through their peripheries and a ratchet-wheel upon their outer ends, in combination with a pawl carried by each of the carriage-wheels and adapted to engage each with one of said ratchet-wheels, whereby said drums are adapted to be revolved together or separately, substantially as described.

2. In combination with a revolving hollow fertilizer-holding drum, a series of buckets secured in fixed positions within said drum, and each provided with an opening to the exterior of the drum, and a swinging gate arranged to alternately open and close the entrance to said bucket and the opening through the periphery of the drum, substantially as described.

3. In combination with the hollow revolving drum, the bucket F, provided with the discharge-opening d, secured in a fixed position within the drum, the plate G', adjustably secured to the exterior of the drum, and the gate G, pivoted to said plate, substantially as described.

4. The combination of the drum E, the bucket F, provided with the discharge-opening $d$, and the pivoted and adjustable gate G, provided with the knife-edged rib $g'$, substantially as described.

5. The combination of the drum E, the ratchet-wheel $D^2$ $j$, the wheel B, having secured thereon the stand I, the pawl H, and the cam $r$, all arranged and adapted to operate substantially as described.

In testimony whereof I have signed my name to this specification, in the presence of two subscribing witnesses, on this 13th day of April, A. D. 1885.

HENRY O. PEABODY.

Witnesses:
WALTER E. LOMBARD,
FRANK E. BRAY.